United States Patent [19]
O'Rourke et al.

[11] Patent Number: 5,710,626
[45] Date of Patent: Jan. 20, 1998

[54] RUGGED FIBER OPTIC PROBE FOR RAMAN MEASUREMENT

[75] Inventors: Patrick E. O'Rourke, Martinez, Ga.; William R. Toole, Jr., Aiken, S.C.; Stanley E. Nave, Evans, Ga.

[73] Assignee: Westinghouse Savannah River Company, Aiken, S.C.

[21] Appl. No.: 746,711

[22] Filed: Nov. 15, 1996

[51] Int. Cl.⁶ ........................................... G01J 3/44
[52] U.S. Cl. ................................. 356/301; 385/12
[58] Field of Search ............................ 356/301, 342, 356/442; 385/12, 13

[56] References Cited

U.S. PATENT DOCUMENTS

| | | |
|---|---|---|
| 4,573,761 | 3/1986 | McLachlan et al. |
| 4,707,134 | 11/1987 | McLachlan et al. |
| 4,857,472 | 8/1989 | Wolfbeis |
| 4,892,383 | 1/1990 | Klainer et al. |
| 4,909,588 | 3/1990 | Harner et al. ........................ 385/12 |
| 4,963,027 | 10/1990 | Koizumi et al. ................... 356/416 |
| 5,030,000 | 7/1991 | Kanda |
| 5,112,127 | 5/1992 | Carrabba et al. .................... 356/301 |
| 5,124,129 | 6/1992 | Riccitelli et al. |
| 5,131,746 | 7/1992 | O'Rourke et al. |
| 5,185,521 | 2/1993 | Kvasnik et al. |
| 5,377,004 | 12/1994 | Owen et al. ........................ 356/301 |
| 5,381,237 | 1/1995 | Sela |
| 5,402,508 | 3/1995 | O'Rourke et al. |
| 5,404,218 | 4/1995 | Nave et al. ........................ 356/301 |
| 5,410,413 | 4/1995 | Sela |
| 5,424,825 | 6/1995 | Delhaye et al. |
| 5,534,997 | 7/1996 | Schrader ........................... 356/301 |

FOREIGN PATENT DOCUMENTS

WO 93/05376  3/1993  WIPO ........................... 356/301

Primary Examiner—Frank G. Font
Assistant Examiner—Zandra V. Smith
Attorney, Agent, or Firm—Kilpatrick Stockton LLP; Dean W. Russell, Esq.; Michael F. Labbee, Esq.

[57] ABSTRACT

An optical probe for conducting light scattering analysis is disclosed. The probe comprises a hollow housing and a probe tip. A fiber assembly made up of a transmitting fiber and a receiving bundle is inserted in the tip. A filter assembly is inserted in the housing and connected to the fiber assembly. A signal line from the light source and to the spectrometer also is connected to the filter assembly and communicates with the fiber assembly. By using a spring-loaded assembly to hold the fiber connectors together with the in-line filters, complex and sensitive alignment procedures are avoided. The close proximity of the filter assembly to the probe tip eliminates or minimizes self-scattering generated by the optical fiber. Also, because the probe can contact the sample directly, sensitive optics can be eliminated.

32 Claims, 2 Drawing Sheets

RUGGED FIBER OPTIC PROBE FOR RAMAN MEASUREMENT

FIELD OF THE INVENTION

The present invention relates to fiber optic probes for Raman spectroscopy of solids, liquids, slurries and gases.

BACKGROUND OF THE INVENTION

Spectrophotometric techniques based on emission, absorption or scattering processes are frequently used for qualitative and quantitative analyses. Development of lasers and optical fibers has allowed placement of sensitive equipment in locations remote from industrial process environments, making spectrophotometry applicable to a wide range of processes. Applications include on-line monitoring of industrial process streams, monitoring the contents of storage tanks, detecting toxic explosive substances, studying the migration of subsurface contaminants, and monitoring air and water quality. Where measurements must be made at many different locations, a number of probes may be connected to a single remotely-located measuring instrument by optical fibers, as in the on-line process control monitoring system disclosed in U.S. Pat. No. 5,131,746 to O'Rourke et al. Remote monitoring is essential in harsh chemical and radioactive environments.

The composition of a sample can often be determined from its absorption spectrum, that is, the frequency or wavelength distribution of the light absorbed by the sample. A typical system for absorption spectroscopy includes a light source, an optical probe containing light-transmitting and light-receiving fibers, and a detector. Light from the source is directed to the sample by the transmitting fiber, passes through the sample and is transmitted to the detector by the receiving fiber. Measurements taken from a suitable reference sample are compared to measurements taken from the test sample to help determine the concentrations of various constituents in the test sample.

Absorption spectroscopy via fiber optics is useful for detecting and characterizing those analytes that have spectra in the ultraviolet (UV), visible (VIS) or near-infrared (near-IR) range. However, many analytes of interest do not have any UV-VIS absorption lines; the "fingerprint" regions of the absorption spectra due to molecular and rotation modes are in the infrared (IR) range. Because presently-available optical fibers severely attenuate IR wavelengths, absorption spectroscopy is not suitable for remote detection of such analytes.

Optical techniques based on other mechanisms such as fluorescence, luminescence and Raman scattering may be used for detection. Raman spectroscopy is a very discriminating analytical technique based on the inelastic scattering of light (typically, monochromatic light from a laser) by a molecule. The rotational or vibrational energy of a molecule is changed as it is excited to a different energy level by the incident light. A very small fraction of the time the incident light is scattered with a loss of energy equal to the energy absorbed by the molecule. Thus, in addition to elastically-scattered light having the same wavelength as the exciting light, the scattered light contains small amounts of light with different wavelengths. The resultant spectrum is characteristic of the scattering molecules, with the intensities of the lines depending on the concentrations of the scattering molecules in the sample.

Since the vibrational and rotational energies are small compared to the excitation photon energy, the Raman spectra peaks are typically in the VIS or near-IR region for an excitation source in the visible region. Therefore, the Raman spectra are less severely attenuated than IR absorption spectra by transmission over optical fibers. In addition, Raman spectroscopy is particularly useful for identifying the components of a sample since Raman spectra contain more spectral lines, and sharper lines, than obtained with other types of spectroscopy.

A major problem in Raman spectroscopy and other light scattering measurements is the low signal-to-noise ratio, that is, the very low intensity of the Raman-scattered light compared to the intensity of the exciting light. Sensitive detection systems with high light gathering power and high stray light rejection are needed to isolate and measure the low intensity Raman signal. Such instruments are costly and delicate and are not well suited for use in many industrial process environments.

Optical fibers may be used to deliver the stimulating signal and collect the scattered light thereby allowing sensitive instruments to be remote from the process environment. However, monochromatic light transmitted by an optical fiber excites the fiber molecules, causing Raman scattering and/or fluorescence within the fiber itself. This "self-scattering" or "silica scattering" generates an additional background signal that interferes with the Raman signal collected from the sample. Also, a great deal of elastically-scattered light may be reflected back to the receiving fibers by the sample and the interior surfaces of the sample container (such as a tank or pipeline). This light also generates self-scattering which may interfere further with the measurements.

Various techniques are available for increasing the amount of light collected by the light-receiving fibers of an optical probe and reducing extraneous signals. For example, properly designed and placed optical filters may be used to remove background noise. A filter which passes only the excitation wavelength may be placed as close as possible to the exit end of the transmitting fiber. A second filter, which excludes the excitation wavelength while passing longer wavelengths, may be placed near the entrance of the receiving fibers. However, conventional Raman probe designs do not allow the proper placement of filters. Similarly, optics may be used to focus the stimulating light to increase signal intensity. However, the efficacy of such optics may be sensitive to probe placement. Furthermore, optics typically require sensitive adjustment and alignment which may be easily disturbed by the process environment. U.S. Pat. Nos. 5,377,004 to Owen et al., 5,112,127 to Carrabba et al., and 5,424,825 to Delhaye et al. disclose various devices which employ a series of lenses, filters and reflectors to condition and focus the exciting light on a sample. However, each of these devices can be difficult to use because of the need to align precisely the optical elements and the difficulty in maintaining a precise distance, or "standoff," between the probe and the sample.

One way to resolve the standoff problem is to have direct contact between the probe and the sample, as described in U.S. Pat. No. 5,185,521 to Kvasnik et al. Kvasnik teaches a probe in which an unclad optical fiber bearing the exciting light is immersed in the sample fluid. The sample either reflects light emitted by the fiber or reacts with a coating on the fiber and thus alters the signal as it is reflected within the fiber by the coating. Self-scattering and other noise problems may be attenuated by the use of filters, although the physical design of such a probe requires that the filters be placed some distance from the probe, leaving an ample length of fiber for such erroneous signals to regenerate. Furthermore, the fiber or the coating thereon may be degraded by the sample, requiring frequent replacement of the probe.

To improve the signal-to-noise ratio and eliminate alignment and stand off problems, in-line filters may be used in conjunction with a probe designed to contact the sample directly, as disclosed in U.S. Pat. No. 5,404,218 to Nave et al., the disclosure of which is incorporated herein in its entirety by this reference. Nave teaches a probe in which the optical fibers may, but need not, be isolated from the sample by a window. Consequently, degradation of the fibers due to a hostile environment may be eliminated, thus reducing the need for frequent replacement of the probe. Because the probe is in contact with the sample, the stand off problem is also eliminated. Filters may be provided in line with the optical fibers before the fibers enter the probe body; however, such an arrangement may not eliminate sufficiently the extraneous signals generated between the filters and the probe tip. Furthermore, conventional mechanisms for maintaining the filters and optical fibers in alignment are difficult and time consuming to assemble. Each time a probe must be replaced, the mechanisms must be disassembled and reassembled and re-aligned.

Alternatively, Nave teaches that the filters may be coatings applied to the ends of the optical fibers. However, such an arrangement requires replacement of the optical fibers each time the frequency of the stimulating light is changed. (Changing the frequency of the stimulating light is often desirable in order to optimize the stimulating frequency to a particular substance that is being sought in the sample.) Also, if the fibers are not isolated from the environment, the sample may degrade the coatings, again requiring frequent replacement of the probe.

Thus, it is desirable to provide an optical probe for use in Raman scattering analysis in which filters are provided in line with the optical fibers as close to the probe tip as possible. It is also desirable to provide a probe that is easily assembled and disassembled so that the filters and other elements can be easily removed and replaced.

SUMMARY OF THE INVENTION

The present invention comprises such an optical probe for use in Raman scattering analysis. An input signal is carried over a transmitting line into the probe body, where it terminates in a first SMA connector. An input filter is disposed between the first SMA connector and a second SMA connector, from which leads a transmitting fiber. The transmitting fiber is routed through the probe body into the probe tip which has a sapphire window affixed at one end. The transmitting filter terminates in the probe tip proximate the sapphire window.

The output signal is received by a receiving bundle which may be least one to as many as six (or more) optical fibers disposed about the transmitting fiber and affixed thereabouts by an epoxy matrix. The matrix is affixed within a third SMA connector which is positioned within the probe tip.

The receiving bundle leads out of the probe tip into the body where it terminates in a fourth SMA connector. The fourth SMA connector joins with a fifth SMA connector with an output filter disposed therebetween. Leading from the fifth SMA connector is a receiving line which may be a bundle of fibers equal in number to the number of fibers in the receiving bundle, or may be a single optical fiber with a sufficiently large diameter to capture the signal from all of the fibers of the receiving bundle.

The first, second, fourth and fifth SMA connectors (and the first and second filters) are located proximate the probe tip. The fibers and lines are affixed within the SMA connectors with epoxy. The connectors are affixed within a bore in the probe body by opposing springs which urge the connectors into their desired position. The filters are placed between the connectors and are held in place by the force generated by the spring. This arrangement allows the elements easily to be assembled and aligned for use. Furthermore, individual elements may easily be removed and replaced as desired.

Accordingly, it is an object of the present invention to provide an optical probe for conducting Raman scattering analysis which functions in direct contact with the sample.

Another object of the present invention is to provide an optical probe for conducting Raman scattering analysis in which filters are provided in-line with the optical fibers of the probe at a point proximate the tip of the probe.

Another object of the present invention is to provide an optical probe for conducting Raman scattering analysis in which the in line filters may be easily assembled and disassembled without the need for precise alignment of the components.

Another object of the present invention is to provide an optical probe for conducting Raman scattering analysis which is easily manufactured.

Other objects, features and advantages of the present invention will become apparent with reference to the remainder of the written portion and the drawings of this application.

DETAILED DESCRIPTION

Figure 1:
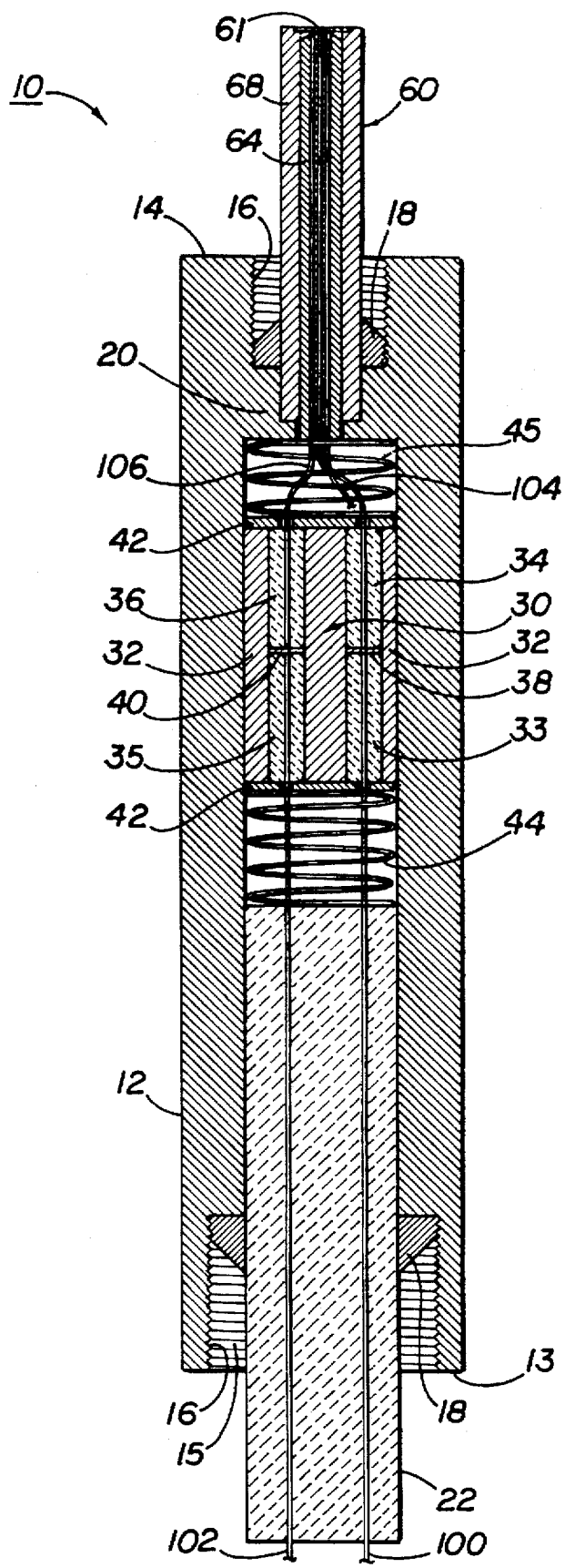
FIG. 1 is a side sectional view of a probe in accordance with the present invention.

FIG. 1 illustrates a probe 10 embodying with the principles of the present invention. Probe 10 comprises housing 12, filter assembly 30, probe tip 60, transmitting line 100, receiving line 102, transmitting fiber 104 and receiving bundle 106.

Housing 12 has proximal end 13 and distal end 14, may be cylindrical and is constructed from aluminum, steel or another suitable material. Housing 12 should be compatible with the structure into which probe 10 is to be inserted and tolerant to the environment within the sampling area. Cavity 15 is provided within housing 12 and threads 16 are provided at both ends of cavity 15. Lock nuts 18 are provided at each end of cavity 15. Lock nuts 18 cooperate with threads 16 to affix the components of probe 10 within cavity 15. Tip flange 20 is also provided within cavity 15 near the distal end 14 of housing 12 for securing probe tip 60 and mounting filter assembly 30. Fiber retention block 22 is mounted within cavity 15 at the proximal end 13 of housing 12 and secured therein by lock nut 18.

Transmitting line 100 and receiving line 102 pass through and are secured within fiber retention block 22. Transmitting line 100 and receiving line 102 each may be at least one silica core fiber optic cable with doped silica cladding having a low OH⁻ and a polyimide buffer. Other suitable means for transmitting and receiving the test signals also may be selected. Transmitting line 100 originates at a light source and terminates in filter assembly 30. The light source is typically a laser which generates a signal with a desired frequency. Receiving line 102 originates in a detection system and terminates in filter assembly 30. The detection system is typically a charged coupled device detector and spectrometer, which are used to measure characteristics of the scattered light such as spectral profile and intensity. Lines 100 and 102 may be combined in a "duplex" fiber-optic cable for convenience, that is, lines 100 and 102 may be bonded in conventional fashion to form a single cable.

Transmitting fiber 104 and receiving bundle 106 originate in filter assembly 30 and terminate in probe tip 60. Transmitting fiber 104 and receiving bundle 106 each may be at least one silica core fiber optic cable with doped silica cladding having a low OH⁻ and a polyimide buffer. Other suitable means for transmitting and receiving the test signals may also be selected.

Figure 2:
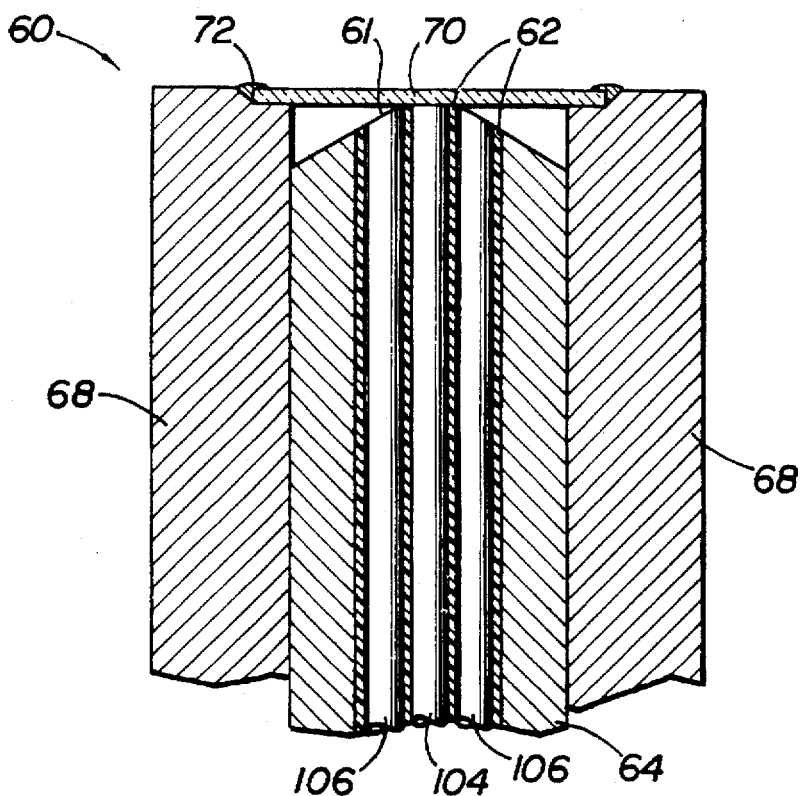
FIG. 2 is a side sectional view of the tip of the probe of FIG. 1.
Figure 3:
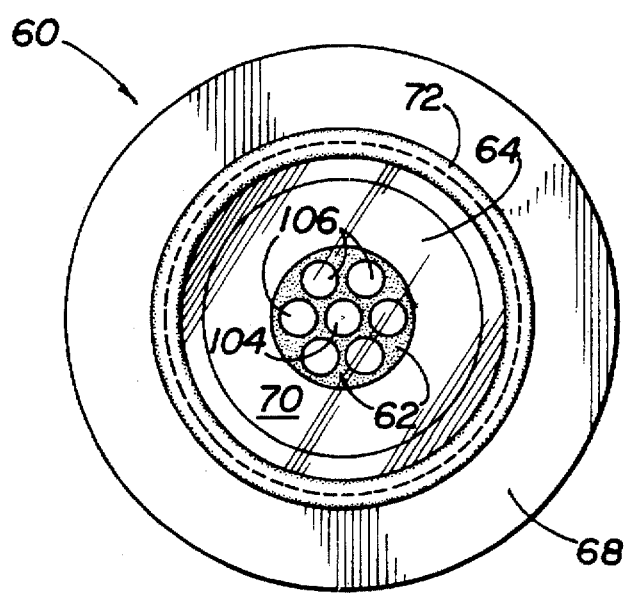
FIG. 3 is a top view of the probe tip of FIG. 2.

In a preferred embodiment, transmitting fiber 104 is a single optical fiber and receiving bundle 106 comprises six optical fibers. Referring to FIGS. 2 and 3, the fibers are arranged within probe tip 60 such that transmitting fiber 104 is in the center of probe tip 60 and the fibers of receiving bundle 106 surround transmitting fiber 104. Approximately one inch of the polyimide buffer is removed from the end of fibers 104, 106 proximate tip 61. The fibers 104, 106 are affixed in a tightly packed bundle arrangement within epoxy matrix 62. Epoxy matrix 62 may employ a carbon-black filled epoxy to eliminate cross-talk between fibers.

The fiber assembly is encased in SMA body 64 and positioned within tip housing 68 proximate to sapphire window 70. SMA body 64 is a conventional SMA connector without the threaded hood. Tip housing 68 is a cylindrical hollow body made of aluminum, steel or other suitable material. Tip housing 68 is positioned in cavity 15 proximate distal end 14 of probe 10. Tip housing 68 is urged against flange 20 and held in place by lock nut 18. Window 70 is about one-half millimeter in thickness and about five millimeters in diameter or may be of other dimensions as required by the conditions in which the probe will be used. Window 70 is affixed to tip housing 68 by a gold-brazed seal 72. Tip 61 of the fiber assembly is positioned proximate window 70, with spring 45 urging tip 61 against window 70. Tip 61 may be polished into a cone-shaped taper with the cone angle chosen so that the crossing point of the light cones is just beyond window 70, as disclosed in U.S. Pat. No. 5,402,508 to O'Rourke et al., which is incorporated herein in its entirety by this reference.

Referring to FIG. 1, filter assembly 30 comprises alignment cylinder 32, SMA connectors 33, 34, 35 and 36, input filter 38 and output filter 40. Alignment cylinder 32 is made of metal or another suitable material and is of about the diameter of cavity 15. Cylinder 32 has two axial bores provided therein which are of about the diameter of SMA connectors 33–36. SMA connectors 33–36 are conventional SMA connectors with the threaded hoods removed. Input filter 38 is a laser pass dielectric filter having greater than seventy-five percent transmission at the laser line with a half-width corresponding to five-hundred cm⁻¹. Output filter 40 is a long-pass dielectric filter with forty decibel or greater blocking at the laser line but greater than seventy-five percent transmission for longer wavelengths, i.e., five-hundred cm⁻¹ away from the laser line. Other suitable filters may be selected.

The free end of transmitting fiber 104, i.e., the end which extends from the probe tip, is epoxied into SMA connector 34. Similarly, the end of receiving bundle 106 is epoxied into SMA connector 36. If more than one fiber is used in receiving bundle 106, carbon-black filled epoxy may be used to eliminate cross-talk. The free ends of lines 100 and 102 are epoxied into SMA connectors 33 and 35, respectively.

Filters 38 and 40 are disposed between SMA connectors pairs 33/34 and 35/36, respectively, as they are inserted into the bores of cylinder 32. The entire assembly is placed in cavity 15 where it is held in place by washers 42 and springs 44 and 45. Washers 42 and springs 44, 45 are of about the same diameter as cylinder 32. Springs 44, 45 may be coil springs or any other suitable means of urging the components together. Alternatively, only one spring may be used in such a manner as to maintain the components in the desired position.

Washers 42 have holes provided therein which correspond to the bores in cylinder 32 so that the fibers emanating from SMA connectors 33–36 may pass therethrough. Springs 44 and 45 urge SMA connectors 33–36 together, thereby maintaining the communication between fibers 104, 106 and lines 100, 102, respectively. Block 22 is provided to secure all of the components within cavity 15.

If a six-fiber bundle is used for receiving bundle 106 and a similar bundle is used for receiving line 102, the ends of each of the individual fibers must be aligned so that fiber 106 and line 102 can communicate. To facilitate alignment, a "dummy" fiber may be inserted in the middle of each of the fiber bundles creating an arrangement similar to that shown in FIG. 3. With this arrangement, when bundle 106 and line 102 are joined, one need only rotate the SMA connectors 35 and 36 until the fibers are aligned. Proper alignment can be detected by passing a test signal through bundle 106 and rotating connectors 35 and 36 until a signal is received through line 102. Connectors 35, 36 may then be locked in place with alignment screws.

Alternatively, line 102 may comprise a single fiber of sufficient diameter as to allow collection of the signal from bundle 106, in which case no alignment is needed. While the alternative arrangement may introduce unwanted signals received from the cladding of the fibers in bundle 106, these signals may be insignificant or eliminated through filtering or other means.

A linear pattern must be provided to the spectrometer. If line 102 comprises a bundle of fibers, the fibers may simply be "stacked" in a line at the spectrometer end of line 102. If a single fiber is used in line 102, the proper signal may be provided by inserting a short multi-fiber cable with a circular to linear cross-section conversion at the spectrometer end of line 102.

To perform a Raman scattering analysis, probe 10 is mounted to a vessel containing the sample such that probe tip 60 extends into the vessel and is immersed or placed in contact with the sample. For instance, probe 10 may be inserted into a port provided in a pipe carrying a slurry or in a port in a holding tank.

A test signal is generated by a light source, such as a laser, and is introduced into transmitting line 100, which carries the signal into probe 10. Connector 33 holds the terminus of line 100 in contact with, or in close proximity to, input filter 38. The test signal leaves line 100 and passes through input filter 38, which eliminates or reduces unwanted noise. The signal is then captured by transmitting fiber 104, which emits the test signal through window 70. The test signal is scattered by the sample and the scattered signal is received by receiving bundle 106 which directs the signal through output filter 40. Output filter 40 eliminates or reduces unwanted noise and the signal is captured by receiving line 102, which carries the signal to a spectrometer for analysis.

If a different frequency of test signal is desired, thus requiring filters with different characteristics, block 22 may be removed and connectors 33 and 35 withdrawn from cylinder 32. Filters 38 and 40 may then be removed and replaced with the desired filters and the probe reassembled. Similarly, if probe tip 60 is damaged, it may also be removed and replaced.

Although the foregoing is provided for purposes of illustrating, explaining and describing embodiments of the present invention, modifications and adaptations to these embodiments will be apparent to those skilled in the art and may be made without departing from the scope or spirit of the invention.

What is claimed is:

1. An optical probe for use in light scattering analysis of a sample comprising:
   a) a housing having a proximal end, a distal end and defining a first cavity;
   b) a filter assembly positioned within the first cavity;
   c) a probe tip positioned at the distal end of the housing and defining a second cavity which communicates with the first cavity;
   d) a fiber assembly positioned within the second cavity and communicating with the filter assembly;
   e) a transmitting/receiving line positioned in the first cavity and communicating with the filter assembly; and
   f) at least one spring urging the fiber assembly and the transmitting receiving line together thereby holding the filter assembly therebetween.

2. The probe of claim 1 in which the fiber assembly comprises:
   a) a transmitting fiber having a proximal end and a distal end;
   b) a receiving bundle having a proximal end and a distal end; and
   c) an epoxy matrix in which distal ends of the transmitting fiber and the receiving bundle are embedded.

3. The probe of claim 1 in which the probe tip comprises a housing having an end and a window affixed to the end in which the fiber assembly abuts the window.

4. The probe of claim 2 in which the transmitting fiber comprises at least one optical fiber.

5. The probe of claim 2 in which the receiving bundle comprises at least one optical fiber.

6. The probe of claim 2 in which the receiving bundle comprises a plurality of optical fibers.

7. The probe of claim 2 in which the receiving bundle comprises six optical fibers.

8. The probe of claim 2 in which the transmitting fiber comprises a silica core fiber optic cable with doped silica cladding having a low OH and a polyimide buffer.

9. The probe of claim 2 in which the receiving bundle comprises at least one silica core fiber optic cable with doped silica cladding having a low OH and a polyimide buffer.

10. The probe of claim 2 in which the receiving bundle comprises a plurality of silica core fiber optic cables with doped silica cladding having a low OH and a polyimide buffer.

11. The probe of claim 2 in which the receiving bundle comprises six silica core fiber optic cables with doped silica cladding having a low OH and a polyimide buffer.

12. The probe of claim 2 in which the fiber assembly further comprises:
   a) a first connector attached to the proximal end of the transmitting fiber; and
   b) a second connector attached to the proximal end of the receiving bundle.

13. The probe of claim 12 in which the transmitting/receiving line comprises:
   a) a transmitting line having a proximal end and a distal end, the proximal end connected to a light source and the distal end affixed to a third connector; and
   b) a receiving line having a proximal end and a distal end, the proximal end connected to a spectrometer and the distal end affixed to a fourth connector.

14. The probe of claim 13 in which the transmitting line comprises at least one optical fiber.

15. The probe of claim 13 in which the transmitting line comprises at least one silica core fiber optic cable with doped silica cladding having a low OH and a polyimide buffer.

16. The probe of claim 13 in which the receiving line comprises at least one optical fiber.

17. The probe of claim 13 in which the receiving line comprises at least one silica core fiber optic cable with doped silica cladding having a low OH and a polyimide buffer.

18. The probe of claim 13 in which the receiving line comprises a plurality of optical fibers.

19. The probe of claim 13 in which the receiving line comprises a plurality of silica core fiber optic cables with doped silica cladding having a low OH and a polyimide buffer.

20. The probe of claim 13 in which the filter assembly comprises:
   a) a cylinder having a first bore and a second bore;
   b) an input filter disposed in the first bore; and
   c) an output filter disposed in the second bore.

21. The probe of claim 20 in which the first connector and the third connector are positioned in the first bore with the input filter disposed therebetween.

22. The probe of claim 21 in which the second connector and the fourth connector are positioned in the second bore with the output filter disposed therebetween.

23. The probe of claim 22 in which the first, second, third and fourth connectors are held in position by at least one spring positioned within the first cavity such that the spring urges the first and third connectors together and the second and fourth connectors together.

24. The probe of claim 20 in which the first, second, third and fourth connectors are conventional SMA connectors with the hoods removed.

25. The probe of claim 20 in which the light source is a laser having a laser line.

26. The probe of claim 25 in which the input filter is a laser pass dielectric filter having greater than seventy-five percent transmission at the laser line with a half-width corresponding to five-hundred cm−1.

27. The probe of claim 26 in which the output filter is a long-pass dielectric filter with forty decibel or greater blocking at the laser line but greater than seventy-five percent transmission for wavelengths about five-hundred cm−1 or more away from the laser line.

28. An optical probe for use in light scattering analysis of a sample comprising:
   a) a housing;
   b) first carrying means, positioned within the housing, for carrying first and second test signals in which the first test signal is delivered to a sample and the second test signal is received from the sample;
   c) second carrying means, positioned within the housing and communicating with the first carrying means, for carrying the first and second test signals;

d) means, interposed between the first and second carrying means, for filtering the first test signal;

e) means, interposed between the first and second carrying means, for filtering the second test signal; and f) means for urging the first and second carrying means together thereby holding the first and second test signal filtering means therebetween.

29. The optical probe of claim 28 in which the first carrying means comprises:

a) a transmitting fiber having a proximal end, which is affixed within a first SMA connector, and a distal end, which is affixed in a matrix; and b) a receiving bundle having a proximal end, which is affixed within a second SMA connector, and a distal end, which is affixed in the matrix proximate the transmitting fiber.

30. The optical probe of claim 29 in which the second carrying means comprises:

a) a transmitting line having a distal end, which is affixed within a third SMA connector, and a proximal end, which communicates with a light source; and b) a receiving line having a distal end, which is affixed within a fourth SMA connector, and a proximal end, which communicates with a detector.

31. The optical probe of claim 30 in which:

a) the first test signal filtering means comprises an input filter disposed between the transmitting line and the transmitting fiber; and b) the second test signal filtering means comprises an output filter disposed between the receiving line and the receiving bundle.

32. The optical probe of claim 31 in which the urging means comprises at least one coil spring.

* * * * *